UNITED STATES PATENT OFFICE.

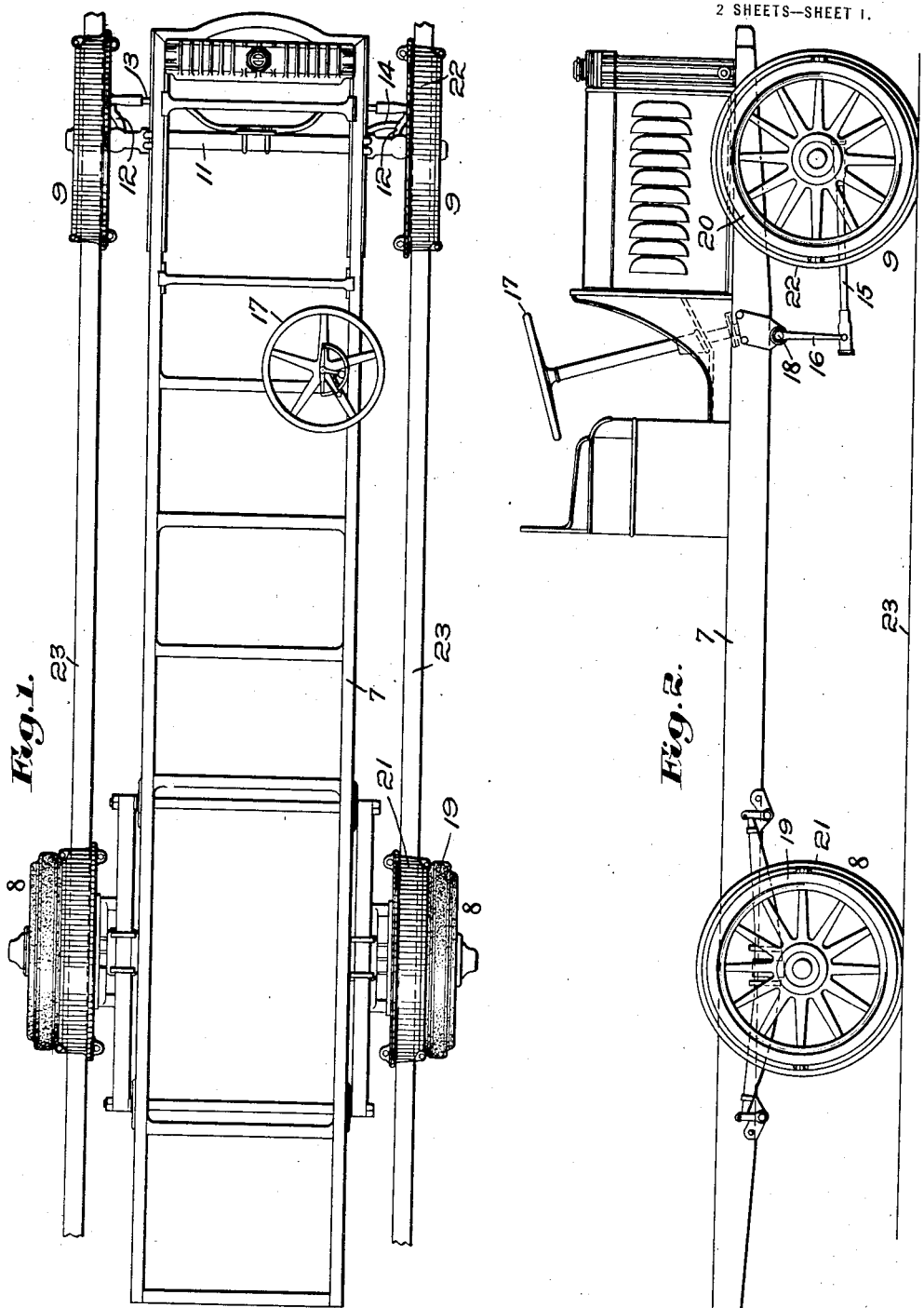

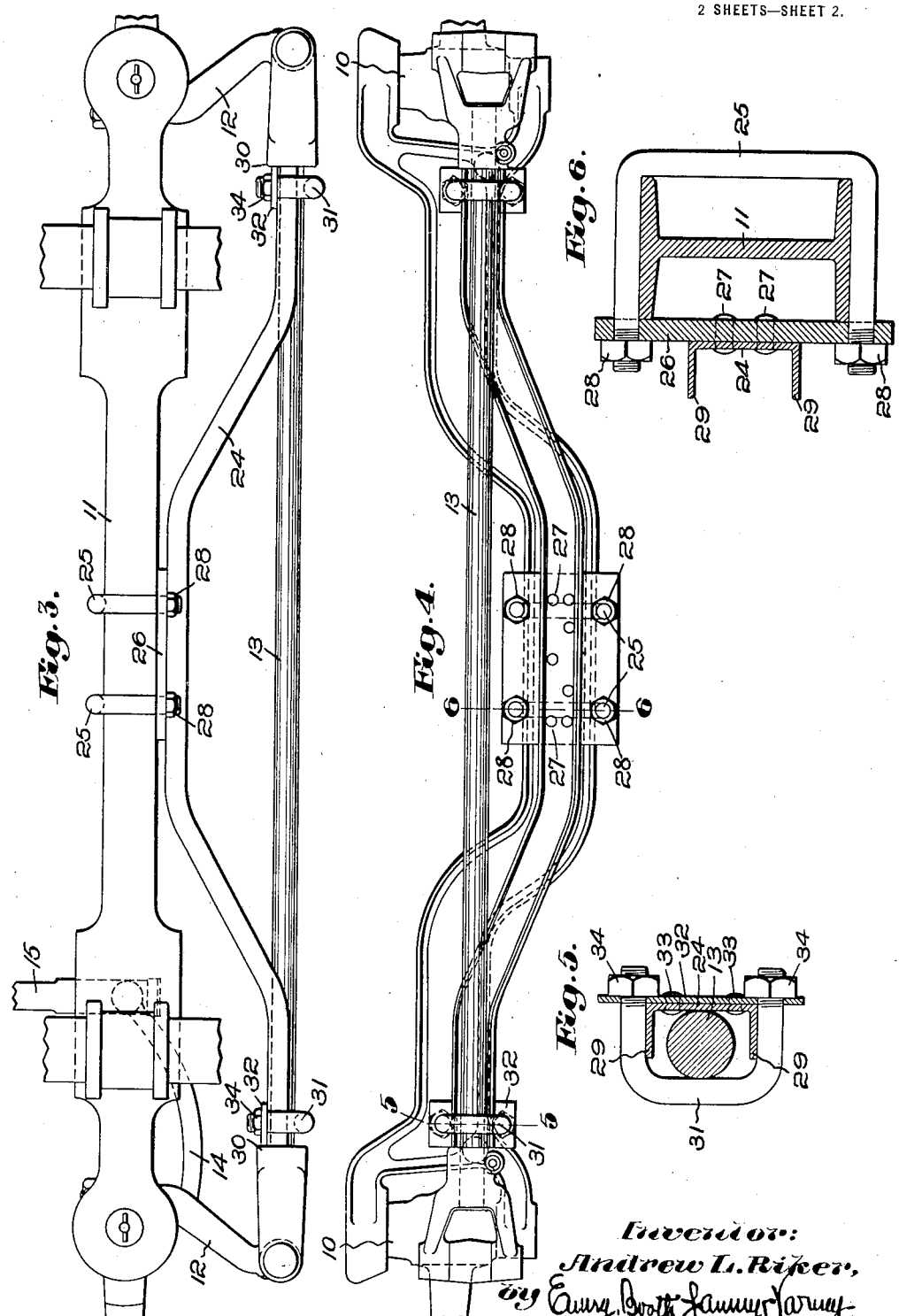

ANDREW L. RIKER, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

CONVERTIBLE RAILWAY AND ROADWAY VEHICLE.

1,347,828.   Specification of Letters Patent.   Patented July 27, 1920.

Application filed November 10, 1916. Serial No. 130,658.

*To all whom it may concern:*

Be it known that I, ANDREW L. RIKER, a citizen of the United States, and a resident of Bridgeport, county of Fairfield, and State of Connecticut, have invented an Improvement in Convertible Railway and Roadway Vehicles, of which the following description, in connection with the accompanying drawings, is a specification, like characters on the drawings representing like parts.

This invention relates to vehicles, and is more especially concerned with a convertible vehicle which has provision whereby the same may be adapted to railway or roadway use at will, so that in the course of a journey from one point to another, it may use railways and roadways, making the change from one to the other and back again, as circumstances may require.

My invention will be best understood by reference to the following description, when taken in connection with the accompanying drawings of one specific embodiment thereof, while its scope will be more particularly pointed out in the appended claims.

In the drawings:

Figure 1 is a plan of a motor vehicle embodying my invention, as it appears when adapted for use upon a railway (the rails of which are shown), some of the non-essential portions of the vehicle being omitted;

Fig. 2 is a side elevation of the same;

Fig. 3 is a detail plan on an enlarged scale showing the front axle, a portion of the steering mechanism, and the locking devices for rendering the latter ineffective when it is desired to use the vehicle on a railway;

Fig. 4 is a front elevation of the parts shown in Fig. 3;

Fig. 5 is a detail sectional view on an enlarged scale on line 5—5 of Fig. 4; and Fig. 6 is a detail sectional view on an enlarged scale on line 6—6 of Fig. 4.

Referring to the drawings, and to the embodiment of my invention which I have selected for illustration, I have there shown a motor vehicle, the general features of which are best seen in Figs. 1 and 2, the same having a frame 7 supported upon a pair of rear driving wheels 8 and a pair of front wheels 9, the latter being used to direct the vehicle, and to that end are journaled on steering knuckles 10—10, fulcrumed on an axle 11. These steering knuckles, which are of common form, are provided with arms 12—12 connected to each other by a link 13, commonly called a cross-rod or cross-tube, which causes the conjoint steering movement of the wheels. The direction of the latter may be controlled by any suitable steering mechanism, herein a usual form of steering gear comprising an arm 14 formed on or rigidly secured to one of the steering knuckles 12, and connected by a link 15, usually known as a drag-link, with a depending steering arm 16, the latter being controlled by a steering wheel 17 through usual mechanism which it will be unnecessary here to describe. It will suffice to state that the arm 16 swings forward and backward about a fulcrum 18, and its motion is communicated through the link 15 to one of the steering knuckles 12. Since the two steering knuckles are linked together, they are caused to move in unison, and give conjoint steering movement to the wheels 9.

The wheels 8 are herein provided with usual tires 19, and the wheels 9 with usual tires 20, suitable for use upon the ordinary roadways. In the case of the rear wheels, the latter as herein shown are of the dual type, and are therefore provided with dual tires.

When the vehicle is equipped for roadway use, the steering mechanism is utilized in the customary manner to give it direction by turning the front wheels laterally in a well-known manner. When, however, the vehicle is to be operated upon a railway, the wheels and steering mechanism are converted to adapt the vehicle for railway use. To this end, the wheels 8 are then equipped with flanged railway tires 21, and the wheels 9 with flanged railway tires 22, encircling the roadway tires and adapted to run upon rails 23. When the wheels are thus equipped, it becomes desirable to provide means to render the steering mechanism ineffective, and to lock the front wheels 9 against lateral movement, as otherwise they would be apt to cause the vehicle to become derailed. I have, therefore, provided the steering mechanism with locking means which I will now describe.

Referring to Figs. 3 to 6, inclusive, I have there shown the preferred form of locking device, the same comprising a locking member 24 interposed between the axle 11 and link 13, and secured to both. As a convenient means for holding this locking member against movement with relation to the axle 11, I have herein provided suitable clamping means comprising a pair of U-shaped bolts 25 embracing the axle and extending through a perforated plate 26, the latter being suitably secured to the locking member 24, as by means of rivets 27. Nuts 28 threaded onto the bolts 25 coöperate therewith to draw the plate 26 into firm engagement with the axle, thus holding the locking member 24 in fixed position with relation to the axle.

The locking member 24 may be of any suitable cross sectional shape, but is herein in the form of a channel bar having a pair of flanges 29 embracing the link 13, as best seen in Fig. 5. As herein shown, the link 13 is provided with a pair of inwardly facing shoulders 30, against which the ends of the locking member 24 abut, as best seen in Fig. 3. It is now evident that the locking member 24 not only embraces the link 13, but is interlocked therewith, and by reason of its interlocking engagement, securely holds the link against lengthwise movement and hence prevents swinging movement of the steering knuckles 12.

As a means for giving the locking device additional security, I have herein provided suitable clamping means for clamping the terminal portions of the locking member 24 to the link 13, said clamping means herein comprising a pair of U-shaped bolts 31, best seen in Fig. 5, passing through perforated plates 32, the latter being secured to the locking member 24 by suitable means, herein rivets 33. Nuts 34, threaded onto the bolts 31, serve to force the locking member 24 firmly against the link 13, and thus clamp the latter.

When the vehicle is to be used upon a railway, the flanged railway rims 21 and 22 are applied to the wheels and the steering mechanism is locked by putting the described locking devices into place, as shown in Figs. 3 to 6, inclusive, it being understood, of course, that the front wheels are first placed in a straight-ahead position. The vehicle can now be used upon a railway without danger of derailment, which would be apt to occur through accidental movement of the steering mechanism if the locking devices were not employed. When, on the other hand, it again becomes desirable to run the vehicle over ordinary roadways, the flanged railway rims are removed from the wheels, and the locking device is removed from the steering mechanism, thereby adapting the vehicle to roadway use. The change from one to the other is accomplished very quickly and conveniently. The locking device possesses the advantages of sturdiness, simplicity and ease of application, and an important feature is the fact that the side thrust exerted on the wheel flanges in passing curves, switches and forks, is transmitted directly to the front axle. Since these side stresses may be very considerable, it is essential that the locking device should perform this function without any opportunity for such stresses to cause undue wear at the points of application, thereby causing the wheels to become insecure or capable of turning on their steering pivots. In the described device, there is no opportunity for any such wear, and hence the device is capable of being used indefinitely and of giving satisfactory results.

While I have herein shown and described one specific form or embodiment of my invention for illustrative purposes, and have discussed and disclosed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. A convertible roadway and railway vehicle comprising, in combination, a pair of wheels, a pair of steering knuckles on which said wheels are journaled, an axle on which said knuckles are pivoted for steering movement, a link connecting said knuckles together to cause their conjoint movement, means for turning said knuckles to steer the vehicle when used on a roadway, and means for holding said link in fixed position thereby to adapt the vehicle for use upon a railway, the last-mentioned means including a holding member disposed lengthwise of said axle and link, and means for clamping said member laterally against said axle and said link.

2. A convertible roadway and railway vehicle comprising, in combination, a pair of wheels, a pair of steering knuckles on which said wheels are journaled, an axle on which said knuckles are pivoted for steering movement, a link connecting said knuckles together to cause their conjoint movement, means for turning said knuckles to steer the vehicle when used on a roadway, a member interposed between said link and said axle and laterally interengaged with said link, clamping means to clamp said member laterally against said axle, and clamping means to clamp said member laterally against said link, thereby to hold said link in fixed position with relation to said axle to adapt the vehicle for use upon a railway.

3. A convertible roadway and railway vehicle comprising, in combination, a pair of wheels, a pair of steering knuckles on which said wheels are journaled, an axle on which said knuckles are pivoted for steering movement, a link connecting said knuckles together to cause their conjoint movement, means for turning said knuckles to steer the vehicle when used on a roadway, a channel member having a pair of flanges embracing said link, clamping means to secure said member to said axle, and clamping means to secure said member to said link thereby to hold said link in fixed position with relation to said axle to adapt the vehicle for use upon a railway.

4. A convertible roadway and railway vehicle comprising, in combination, a pair of wheels, a pair of steering knuckles on which said wheels are journaled, an axle on which said knuckles are pivoted for steering movement, a link connecting said knuckles together to cause their conjoint movement, means for turning said knuckles to steer the vehicle when used on a roadway, a channel member having a pair of flanges embracing and interlocked with said link, clamping means including U-shaped bolts embracing said member and said link and clamping them together, and clamping means including one or more U-shaped bolts embracing said axle and clamping said member thereto.

5. A convertible roadway and railway vehicle comprising, in combination, a pair of wheels, a pair of steering knuckles on which said wheels are journaled, an axle on which said knuckles are pivoted for steering movement, a link connecting said knuckles together to cause their conjoint movement, means for turning said knuckles to steer the vehicle when used on a roadway, a channel member having a pair of flanges embracing and interlocked with said link adjacent opposite ends, respectively, of the latter, perforated plates secured to said member, one adjacent the middle and two adjacent the ends of said member, and U-shaped bolts extending through said perforated plates and clamping the latter, one to said axle and the other two to said link.

In testimony whereof, I have signed my name to this specification.

ANDREW L. RIKER.